(12) United States Patent
Schneider et al.

(10) Patent No.: US 11,106,195 B2
(45) Date of Patent: Aug. 31, 2021

(54) COMMUNICATION UNIT, CONTROL APPARATUS, FIELD DEVICE, COMMUNICATION SYSTEM AND METHOD

(71) Applicant: Festo SE & Co. KG, Esslingen (DE)

(72) Inventors: Danny Schneider, Lichtenwald (DE); Christian Waldeck, Esslingen (DE); Eduard Faber, Stuttgart (DE); Thomas Lederer, Kernen (DE)

(73) Assignee: FESTO SE & CO. KG, Esslingen (DE)

( * ) Notice: Subject to any disclaimer, the term of this patent is extended or adjusted under 35 U.S.C. 154(b) by 30 days.

(21) Appl. No.: 16/682,567

(22) Filed: Nov. 13, 2019

(65) Prior Publication Data
US 2020/0166911 A1 May 28, 2020

(30) Foreign Application Priority Data
Nov. 26, 2018 (DE) .......................... 102018220302.4

(51) Int. Cl.
| | |
|---|---|
| *G06F 1/32* | (2019.01) |
| *G05B 19/418* | (2006.01) |
| *G06F 1/12* | (2006.01) |
| *G06F 1/324* | (2019.01) |
| *H04J 3/06* | (2006.01) |
| *G06F 1/08* | (2006.01) |

(52) U.S. Cl.
CPC .......... *G05B 19/4185* (2013.01); *G06F 1/08* (2013.01); *G06F 1/12* (2013.01); *G06F 1/324* (2013.01); *H04J 3/0658* (2013.01); *G05B 2219/25041* (2013.01)

(58) Field of Classification Search
CPC ...... G05B 19/4185; G05B 2219/25041; G06F 1/08; G06F 1/12; G06F 1/324; H04J 3/0658
See application file for complete search history.

(56) References Cited

U.S. PATENT DOCUMENTS

| | | | |
|---|---|---|---|
| 2009/0009228 A1* | 1/2009 | Jang ...................... | H03L 7/0812 327/295 |
| 2011/0211582 A1 | 9/2011 | Zhou et al. | |
| 2016/0127067 A1* | 5/2016 | Bunte ................... | H04J 3/0658 370/503 |
| 2018/0004541 A1* | 1/2018 | Jang ...................... | G06F 1/3206 |

FOREIGN PATENT DOCUMENTS

DE          102014105211 A1    10/2015

* cited by examiner

*Primary Examiner* — Zahid Choudhury
(74) *Attorney, Agent, or Firm* — Hoffmann & Baron, LLP

(57) ABSTRACT

A communication unit (S1, S2) for industrial automation for use in a communication system (10) of series-connected communication units (M, S1, S2). The communication unit includes a first input (E1) and a first output (A1) and being configured to receive, via the input (E1), an input serial data stream having payload data and to output, via the output (A1), an output serial data stream (ADS) having payload data. The communication unit (S1, S2) is configured to determine clock information (TI) on the basis of an internal reference clock signal of the communication unit (S1, S2) and an input symbol clock of the input data stream and, using the clock information (TI), to provide the output data stream (ADS) with an output symbol clock whose clock rate is equal to the clock rate of the input symbol clock.

23 Claims, 3 Drawing Sheets

COMMUNICATION UNIT, CONTROL APPARATUS, FIELD DEVICE, COMMUNICATION SYSTEM AND METHOD

BACKGROUND OF THE INVENTION

The invention pertains to a communication unit for industrial automation. The communication unit is to be used in a communication system of series-connected communication units. The communication unit comprises a first input and a first output and is configured to receive an input serial data stream containing payload data via the input and to output an output serial data stream containing payload data via the output.

The communication unit is, for example, part of a control apparatus and/or a field device, for example a valve device, and is used in particular for the communication of control commands and/or status information.

SUMMARY OF THE INVENTION

An object of the invention is to provide a communication unit that can achieve a high data transfer rate with low energy consumption.

The object is achieved by a communication unit for industrial automation for use in a communication system of series-connected communication units, the communication unit comprising a first input and a first output and being configured to receive an input serial data stream containing payload data via the input and to output an output serial data stream containing payload data via the output. The communication unit is adapted to determine clock information on the basis of an internal reference clock signal of the communication unit and on the basis of an input symbol clock of the input data stream and to provide, using the clock information, the output data stream with an output symbol clock whose clock rate is equal to the clock rate of the input symbol clock.

Since the input symbol clock and the output symbol clock have exactly the same clock rate, a high data transmission rate can be achieved, especially on temporal average. In particular, this makes it possible to transmit gapless, i.e. to dispense with fill bits or transmit gaps that would otherwise be required to compensate for a clock rate difference between an input symbol clock and an output symbol clock.

The provision of the same clock rate at the output as at the input takes place in a particularly energy-saving manner Expediently, by means of the clock information, a variation of an internal clock signal of the communication unit can be taken into account and can be compensated without adapting the internal clock signal. Consequently, it becomes possible to operate the communication unit permanently with an internal clock that is relatively low and/or independent of the clock rate of the input symbol clock and/or independent of the clock rate of the output symbol clock.

Based on the internal reference clock signal (coupled, for example, with the other internal clock signals of the communication unit) and the input symbol clock, the communication unit can determine how its own internal clock signal relates to the clock rate of the input symbol clock. For this purpose, for example, the communication unit can compare the internal reference clock signal with the input symbol clock. The result of this comparison—the clock information—enables the communication unit to compensate for a variation in the internal clock signal and to provide the output data stream with the same clock rate as the input data stream without having to adapt the internal clock signal and/or provide a particularly high internal clock (e.g. for high oversampling). Since the communication unit can be permanently operated with its own independent and/or relatively low internal clock signal, it becomes possible to achieve low power consumption.

The terms "input symbol clock" and "input data stream" are used to indicate the symbol clock or data stream received by the communication unit. The terms "output symbol clock" and "output data stream" are used to indicate the symbol clock or data stream output by the communication unit. The term "symbol clock" refers in particular to a transmit clock (or a transmit clock cycle).

The invention further pertains to a control apparatus comprising a communication unit described herein, the control apparatus being adapted to control a functional unit, in particular an actuator, sensor and/or a signal unit.

The invention further pertains to a field device, in particular a valve device and/or a remote I/O unit, comprising a communication unit described herein.

Preferably, the invention pertains to one of the following devices, wherein the device comprises one or more communication units in accordance with the invention: Remote I/O system, motor controller, path/robotics control, pneumatic valve, media valve, valve terminal, valve island, industrial sensor, camera system, decentralized programmable logic controller, safety control, especially for functional safety, protocol converter, operating panel.

The invention further pertains to a method of providing an output data stream comprising the steps of: receiving, with a communication unit, an input data stream, determining clock information based on an input symbol clock of the input data stream and an internal reference clock signal of the communication unit, and providing, using the clock information, the output data stream with an output symbol clock whose clock rate is equal to the clock rate of the input symbol clock.

The method is preferably carried out using the communication unit described. Expediently, the method is adapted in accordance with a described embodiment of the communication unit.

BRIEF DESCRIPTION OF THE DRAWINGS

An exemplary embodiment as well as further exemplary details are explained below with reference to the figures.

DETAILED DESCRIPTION

Figure 1:
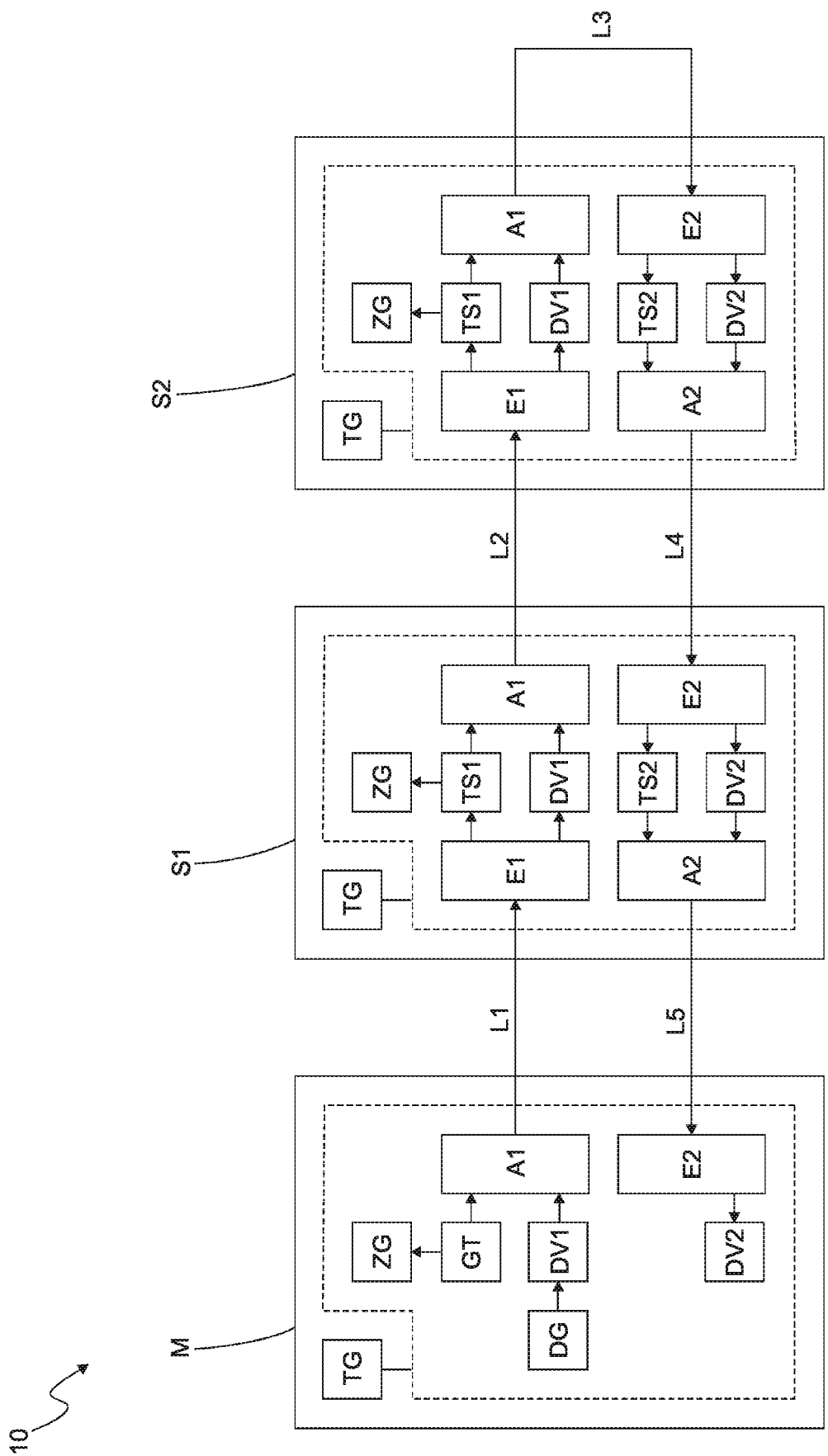
FIG. 1 shows a schematic representation of a communication system with plural communication units.

FIG. 1 shows a communication system 10 comprising plural communication units M, S1, S2 connected in series. Exemplarily, two communication units S1, S2 acting as slaves and one communication unit M acting as master are present. The communication units S1, S2 can also be referred to as slave units and the communication unit M can also be referred to as master unit. Alternatively to the shown amount, more or fewer communication units S1, S2 acting as slaves may be present. Expediently, each communication unit S1, S2, by itself, represents a possible embodiment of the invention. The following explanations primarily refer to the communication unit S1. The communication unit S2 is expediently adapted in correspondence thereto.

The communication unit S1, in particular the entire communication system 10, serves for use in industrial automation, in particular process automation and/or factory automation.

The communication unit S1 comprises a first input E1 and a first output A1. The communication unit S1 is configured to receive, via the input E1, a serial input data stream with payload data and to output, via the output A1, a serial output data stream ADS with payload data. The communication unit S1 is configured to determine clock information TI on the basis of an internal reference clock signal of the communication unit S1 and on the basis of an input symbol clock of the input data stream. The communication unit S1 is further adapted to provide, using the clock information TI, the output data stream ADS with an output symbol clock whose clock rate is equal to the clock rate of the input symbol clock.

Further exemplary details will be explained below.

First, the basic structure of the communication system 10 shown in FIG. 1 will be discussed.

The communication system 10 comprises the communication units M, S1, S2, which are exemplarily connected in series. Each communication unit M, S1, S2 represents a series member with a series position within the series. As an example, the communication unit M is the first series member, the communication unit S1 is the second series member and the communication unit S2 is the third series member. Expediently, the series has one or more further communication units acting as slaves, which are then in particular adapted in correspondence to the communication units S1, S2.

Two communication units adjacent in the series are respectively connected to each other by a communication link. Exemplarily, each communication link comprises two lines. Expediently, each line can have two conductors, for example if the data streams between the communication units are transmitted differentially—i.e. as a voltage difference between the two conductors of a line.

The communication unit M is connected to the communication unit S1 via the lines L1, L5 and the communication unit S1 is connected to the communication unit S2 via the lines L2, L4. The communication links between two communication units adjacent in the series are each bidirectional, wherein one of the two lines serves exclusively for communication in a first direction and the other line serves exclusively for communication in the opposite second direction.

The communication system 10 provides a communication path that, starting from communication unit M, passes through all subsequent communication units S1, S2 twice and then returns to communication unit M. The first run (also referred to as the "outward path") takes place in the sequence specified by the series—i.e. exemplarily in the sequence M, S1, S2. The second run (also called "return path") takes place in reverse order—i.e. exemplarily in the order S2, S1, M. Altogether a ring topology results. During operation, the serial data stream follows this communication path—i.e. the serial data stream passes through all communication units M, S1, S2 twice—once on the outward path and once on the return path.

In the last series element—here the communication unit S2—an output A1 is directly connected to an input E2 via a line L3 in order to close the communication path.

The communication path thus comprises a plurality of path sections, the path sections being provided along the communication path alternately by a communication unit and a line, exemplarily in the following order: M, L1, S1, L2, S2, L3, S2, L4, S1, L5, M. Accordingly, the serial data stream alternately passes through a communication unit and a line respectively on its way along the communication path.

In the following, the individual communication units M, S1, S2 are described in more detail.

The two communication units S1, S2 acting as slaves and the communication unit M acting as master can basically each have the same or alike hardware, i.e. in particular the same or alike electronics. Expediently, a communication unit can, by setting a corresponding mode, be selectively operated as a master or as a slave.

First, the communication units S1, S2 acting as slaves shall be described. The following explanation refers primarily to the communication unit S1. Expediently, the communication unit S2 as well as further optional communication units acting as slaves are configured identically.

As mentioned above, the communication unit S1 comprises a first input E1 and a first output A1. The communication unit S1 also includes an internal clock generator TG and, optionally, a timer ZG. As an example, the S1 communication unit also has a second input E2 and a second output A2.

The first input E1 and the second output A2 shall together be referred to as the first communication interface. The first communication interface is used for bidirectional connection with the communication unit connected upstream in the series. The second input E2 and the first output A1 shall together be referred to as the second communication interface. The second communication interface is used for bidirectional connection with the communication unit connected downstream in the series. In the communication unit with the last series position, the second communication interface is used to close the communication path.

The first input E1 is communicatively coupled with the first output A1. Between the first input E1 and the first output A1 there is optionally a first clock synthesis unit TS1 and exemplarily a first data processing unit DV1. The second input E2 is communicatively coupled with the second output A2. Between the second input E2 and the second output A2 there is optionally a second clock synthesis unit TS2 and exemplarily a second data processing unit DV2.

Exemplarily, there are two paths between the first input E1 and the first output A1. First, a data path for processing the payload data contained in the data stream and, second, a clock path for processing the symbol clock contained in the data stream. The data path and the clock path run exemplarily parallel to each other.

The data path contains the data processing unit DV1, which can also be referred to as the Data Processing Unit, DPU. In the data processing unit DV1, the data contained in the data stream can be changed expediently. Expediently, the output data stream is provided with data other than that contained in the received input data stream.

The clock path serves in particular to provide the clock information TI to the output A1. The clock information TI is obtained exemplarily at the input E1 and transmitted via the clock path to the output A1. Optionally, the clock path includes the clock synthesis unit TS1. The clock information TI can be transmitted to the output A1 via the clock synthesis unit TS1 or, alternatively, to the output A1 without passing through the clock synthesis unit TS1.

The above applies in correspondence expediently to the second input E2, the second output A2 as well as the second data processing unit DV2 and, if present, the optional second clock synthesis unit TS2.

In the following, the clock generator TG will be discussed in more detail. The clock generator TG can expediently be used to provide one or more internal clock signals that can be used within the communication unit S1. As an example, the clock generator TG provides a basic clock on which one, several or all internal clock signals of the communication unit S1 are based.

The internal clock generator TG can also be referred to as a local clock generator or a local clock. The internal clock generator TG includes, for example, a quartz and/or one or more phase-locked loops, PLLs.

The communication unit S1 comprises an electronic circuit, for example a microprocessor, ASIC and/or FPGA. The units E1, TS1, DV1, A1, E2, TS2, DV2, A2 are expediently part of the electronic circuit. The electronic circuit is clocked with one or more internal clock signals provided by the internal clock generator TG. The electronic circuit clocked by the internal clock generator TG is indicated in FIG. 1 by a dashed frame.

The internal clock generator TG is expediently adapted to provide the basic clock or the internal clock signal(s) independently of the input symbol clock and/or the output symbol clock. In particular, there is no synchronization and/or adjustment of the basic clock and/or an internal clock signal based on the input symbol clock and/or the output symbol clock.

Expediently, each communication unit M, S1, S2 has its own internal clock generator TG. The internal clock generators TG of different communication units M, S1, S2 are not synchronized with each other, so that the basic clocks and/or internal clock signals provided on different communication units M, S1, S2 are not synchronous with each other. The internal clock generators TG of the communication units M, S1, S2 can differ from each other particularly in their clock rate.

As internal clock signals, each clock generator TG provides exemplarily a system clock, the internal reference clock signal, an input sampling clock signal and/or an output sampling clock signal. The mentioned clock signals can be multiples of each other and/or multiples of the basic clock provided by the clock generator TG, whereby non-integer ratios can also be realized by means of a PLL. In addition, two or more of the mentioned clock signals may be the same or may be different.

Expediently, the input sampling clock signal is used as a sampling rate for the input data stream. Expediently, an analog-to-digital converter present at the input E1 is operated with the input sampling clock signal as the sampling rate.

The output sampling clock signal is expediently used as a sampling rate for the output data stream ADS. Expediently, a digital-to-analog converter 29 present at the output A1 is operated with the output sampling clock signal as sampling rate.

As an example, the input sampling clock signal is used as the internal reference clock signal. As mentioned above, the internal reference clock signal is used to determine the clock information TI.

The system clock is expediently used to clock different sections of the electronic circuit of the communication unit S1.

As an example, the system clock is equal to the basic clock or a multiple of the basic clock. The clock rate of the internal reference clock signal is exemplarily a multiple of the basic clock. The internal reference clock signal and/or the input sampling clock signal expediently has a higher clock rate than the system clock. The output sampling clock signal is expediently different from the input sampling clock signal and, in particular, has a higher, lower or identical clock rate than the input sampling clock signal.

The clock rate of the input symbol clock is exemplarily between 240 MHz and 260 MHz and is preferably 250 MHz. As an example, the system clock is less than 250 MHz. The clock rate of the input sampling clock signal lies between 290 MHz and 310 MHz and is in particular 300 MHz. The clock rate of the output sampling clock signal lies between 440 MHz and 460 MHz and is in particular 450 MHz.

The internal clock signals of the same communication unit S1 are dependent on each other. In particular, the internal clock signals are coupled with each other, so that in case of variation, for example increase or decrease, of one of the internal clock signals, for example due to manufacturing tolerances or operating conditions, the other clock signals are also varied in correspondence, i.e. increased or decreased. In particular, the input sampling clock signal and/or the internal reference clock signal are coupled to the output sampling clock signal. Expediently, the internal clock signals of the same communication unit S1 behave proportionally to each other.

The input E1 is described in more detail below. Expediently, the input E2 is adapted in correspondence thereto.

To the first input E1, the line L1, in particular a cable or a wire, is connected, via which the data stream is transmitted to the communication unit S1. The communication unit S1 is adapted to receive, via the input E1, the data stream as input data stream. The input E1 can also be referred to as a receiving unit or as "RX".

The input symbol clock is expediently the clock (or clock cycle or interval) with which the individual symbols contained in the input data stream are one after another received at the communication unit S1, in particular the first input E1. Exemplarily, the symbols are individual bits, in particular line bits (e.g. the bits transmitted on the wire). Expediently, a symbol represents a bit. A symbol is expediently represented by a positive impulse or a negative impulse. Alternatively, a symbol can also be represented by the presence or absence of an impulse. An impulse can also be referred to as a "pulse". The input data stream is, for example, coded with a DC voltage-free code, in particular an 8b10b code. Expediently, the input data stream is a baseband transmission.

The input E1 expediently comprises an analog-to-digital converter which, as mentioned above, is operated with the internal input sampling clock signal, in particular the internal reference clock signal, as the sampling rate. The analog-to-digital converter converts the input data stream into a digital input signal. The digital input signal comprises a signal sequence of signal values, each of which has a resolution of more than one bit. Expediently, the signal values each have a resolution of 2 bits, 3 bits, 4 bits, 5 bits, 6 bits or more. Expediently, the digital input signal represents the signal shape of the input data stream, in particular the signal shape of the individual symbols, in particular the individual impulses of the input data stream. The signal shape may also be referred to as "waveform". Expediently, the impulses of the input data stream are bump-shaped (in particular hump-shaped). For example, the impulses each have a cosine shape or a trapezoidal shape. In particular, the impulses have the shape of a rectangle with the edges of a cosine from 0 to 180 degrees or 180 degrees to 360 degrees. Preferably, the input data stream has no vertical edges, i.e. it is in particular not a square wave signal.

The communication unit S1 is adapted to provide the clock information based on the internal reference clock signal and the input symbol clock. In particular, the clock information indicates a relationship between the input symbol clock and the internal reference clock signal. For example, the clock information indicates how high the clock rate of the internal reference clock signal is relative to the input symbol clock. In a sense, the communication unit S1 assesses the clock rate of its own reference clock signal on the basis of the input symbol clock and can thus determine whether and to what extent its own internal clock signals are subject to variations, i.e. are too fast or too slow, for example relative to "normal" or predefined internal clock signals.

The clock information includes in particular a phase relationship and/or a clock rate relationship between the internal reference clock signal and the input symbol clock. Expediently, the clock information includes quantitative information—such as a numerical value—on the phase relationship and/or clock rate relationship. The clock information is determined, for example, on the basis of one or more signal values of the digital input signal sampled with the internal reference clock signal as the sampling rate. For example, one of these signal values (which depend on the internal reference clock signal as the sampling rate and on the input symbol clock) can be used to determine the phase of the input symbol clock relative to the internal reference clock signal. The communication unit S1 expediently comprises a phase detector, in particular a Mueller-Muller phase detector, and determines the clock information TI by means of the phase detector.

As an example, the clock information TI is determined on the basis of a comparison of the internal reference clock signal with the input symbol clock.

The output A1 is described in more detail below. The output A2 is expediently adapted in correspondence thereto.

To the output A1, the line L2 is connected, in particular a cable or wire, via which the data stream is transmitted as an output data stream to the downstream communication unit S2. The output A1 can also be referred to as a transmitting unit or as "TX".

Figure 2:
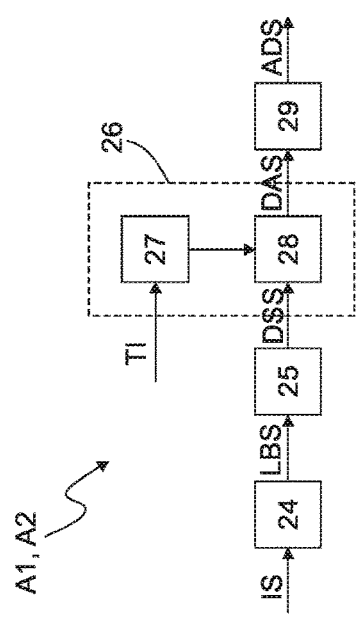
FIG. 2 shows a schematic representation of the output of a communication unit.

FIG. 2 shows an exemplary embodiment of the output A1. The output A1 includes a digital-to-analog converter, DAC, 29 for providing the output data stream ADS. By way of example, the output A1 further comprises a coding unit 24, a digital signal generating unit 25 and/or a filter device 26.

The output A1 receives an information signal IS from the data processing unit DV1. The information signal IS specifies the data to be output in the output data stream ADS. The information signal IS is expediently a binary digital signal. The individual signal values of the information signal preferably have a resolution of one bit.

Optionally, the information signal IS is fed to the coding unit 24. The coding unit 24 generates a line bit signal LBS on the basis of the information signal IS. For example, the coding unit 24 codes the information signal with a line code, in particular a DC-free code, for example an $8b10b$ code, in order to generate the line bit signal LBS. The line bit signal is a signal sequence of line bits. Each signal value of the line bit signal exemplarily represents one line bit. Each line bit expediently has a resolution of one bit.

Optionally, the line bit signal LBS is fed to the digital signal synthesis unit 25. The digital signal synthesis unit 25 is adapted to generate a digital synthesis signal DSS on the basis of the line bit signal LBS. The digital signal synthesis unit 25 can also be referred to as a bit sampler. The digital signal synthesis unit 25 expediently increases the resolution of each signal value to 2 bits or more, especially to 3 bits, 4 bits, 5 bits, 6 bits or more. Optionally, the digital signal synthesis unit 25 increases the number of signal values per line bit. Alternatively or additionally, the number of signal values per line bit can also be increased by the filter device 26, in particular a CIC filter contained in it. The term "signal value" refers in particular to a sample value.

Figure 3:
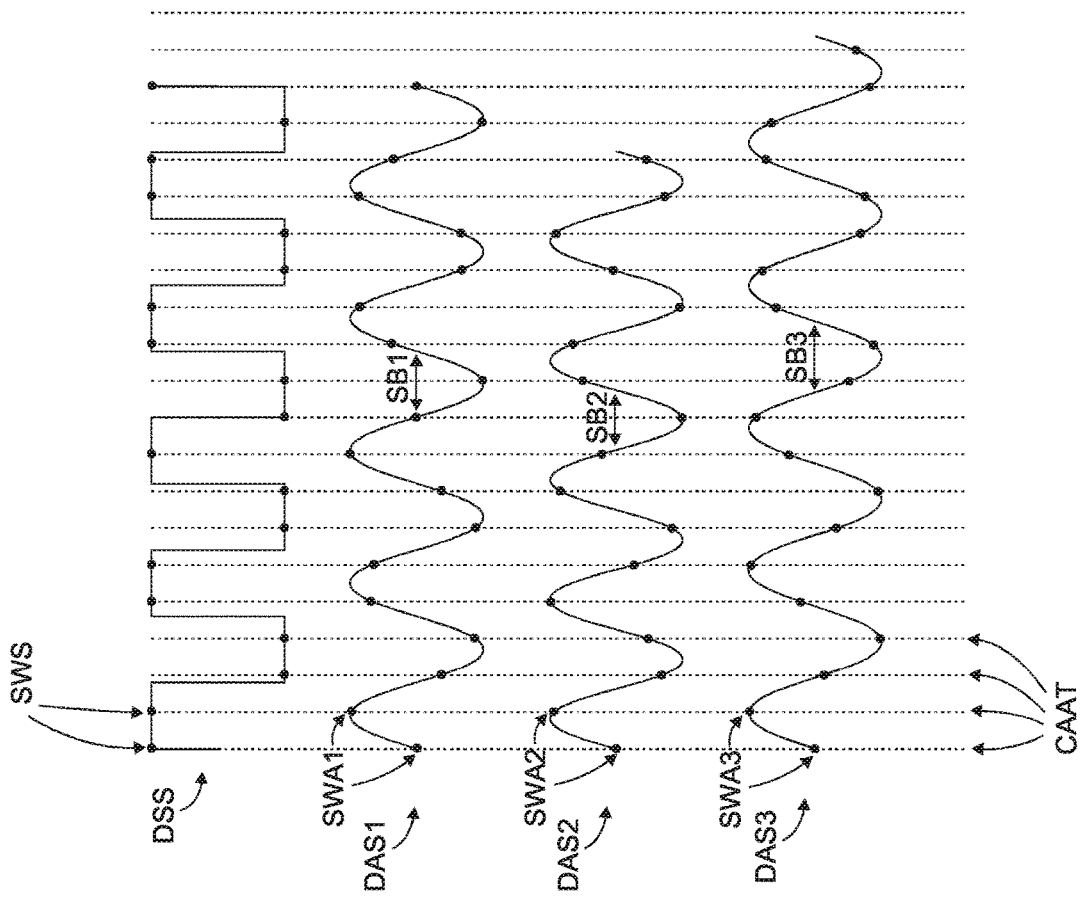
FIG. 3 shows a diagram with plural signals.

FIG. 3 shows an exemplary temporal course of a digital synthesis signal DSS. The digital synthesis signal DSS is represented exclusively by its signal values SWS, which are shown here as dots. For better visibility, only the first two signal values are provided with the reference sign "SWS". Furthermore, an interpolated signal course between the signal values SWS is shown for a better visibility, which, however, is not actually part of the digital synthesis signal DSS.

As an example, the digital synthesis signal DSS has an average of less than 2, in particular 1.8, signal values SWS per line bit. As an example, of five consecutive line bits, four line bits are each represented by two signal values and one line bit is represented by only one signal value.

The signal shape of the digital synthesis signal DSS is exemplarily a rectangular shape. Alternatively, the digital synthesis signal DSS can also have a different signal shape. The digital synthesis signal shown exemplarily represents an alternating line bit sequence 1, 0, 1, 0 etc. The individual signal values of the digital synthesis signal expediently have a resolution of 6 bits. For example, a line bit "1" is represented by a signal value "63" and a line bit "0" is represented by a signal value "0".

The digital synthesis signal DSS is fed to the filter device 26. The filter device 26 is a digital filter that provides a digital output signal DAS based on the digital synthesis signal DSS. For providing the digital output signal DAS, the filter device 26 expediently takes into account the clock information TI.

Exemplarily, the filter device 26 comprises a coefficient determination unit 27 and a filter unit 28. The coefficient determination unit 27 is adapted to provide one or more coefficients for the filter unit 28 based on the clock information TI. The filter unit 28 is adapted to filter the digital synthesis signal DSS using the one or more coefficients so as to provide the digital output signal DAS.

The filter device 26 expediently comprises a low-pass filter. Preferably, the filter device 26 comprises a sample rate conversion filter and/or an interpolation filter. The filter device 26 expediently comprises a multi-rate filter, in particular a cascaded integrator comb filter, CIC. The Cascaded integrator comb filter can also be present without a comb stage, i.e. without a comb filter.

FIG. 3 shows an exemplary temporal course of three different digital output signals DAS1, DAS2, DAS3, each of which was expediently generated with different coefficients of the filter device 26. Depending on the clock information TI, either the first digital output signal DAS1, the second digital output signal DAS2 or the third digital output signal DAS3 is provided. Each digital output signal DAS1, DAS2, DAS3 is represented exclusively by its signal values SWA1, SWA2, SWA3, which are shown here as dots. For a better visibility, only the first two signal values are provided with the respective reference sign. Furthermore, for better visibility, a signal course between the signal values is shown, which, however, is not actually part of the digital output signals DAS1, DAS2, DAS3.

The signal shape of each digital output signal DAS1, DAS2, DAS3 is exemplarily wave-shaped. Expediently, each line bit—i.e. each symbol—is represented by a bump-shaped (in particular hump-shaped) impulse, for example a cosine impulse. Each digital output signal DAS1, DAS2, DAS3 still contains the same line bits as the digital synthesis signal DSS. The shown digital output signals DAS1, DAS2, DAS3 exemplarily represent the alternating line bit sequence 1, 0, 1, 0 etc. The individual signal values of the digital output signals DAS1, DAS2, DAS3 expediently have a resolution of 6 bits. Expediently, the signal values of the digital output signals DAS1, DAS2, DAS3 take on values between the maximum and minimum signal values in order to be able to represent the bump-shaped impulses. Each digital output signal thus contains more than two different signal values (i.e. signal values that differ in their value from each other), in particular more than 60.

The digital output signals DAS1, DAS2, DAS3 differ in their signal values. Furthermore, the digital output signals DAS1, DAS2, DAS3 differ in particular in the number of signal values per symbol, i.e. per bump-shaped impulse. The first digital output signal DAS1 has an average of 1.8 signal values per symbol, the second digital output signal DAS2 has an average of fewer signal values per symbol than the first digital output signal DAS1, and the third digital output signal DAS3 has an average of more than 1.8 signal values per symbol.

The generated digital output signal DAS is fed to the DAC 29, which generates the output data stream ADS on the basis of the digital output signal DAS. The output data stream ADS has a signal shape with bump-shaped (in particular hump-shaped) impulses. For example, the signal shape of the output data stream ADS corresponds to one of the interpolation lines shown in FIG. 3, which connect the signal values of the digital output signals.

The DAC 29 is operated with the output sampling clock signal CAAT as sampling rate. Expediently, the DAC 29 provides for each clock (in particular each clock cycle) of the output sampling clock signal CAAT a signal value of the digital output signal DAS as analog voltage value of the output data stream. The analog voltage value is provided, for example, as voltage difference between two conductors of the line connected to the output A1.

The following explains how the output data stream ADS may be provided with the same clock rate as the input data stream, in particular using the output A1 described above and the clock information TI.

As explained above, the clock information TI indicates how the internal reference clock signal relates to the input symbol clock and is therefore an indicator of how fast the internal reference clock signal is. Since, as explained above, the internal clock signals of the communication unit S1 are coupled to each other, the clock information can also be used to determine how fast the output sampling clock signal CAAT is.

The communication unit S1 is configured to adapt the signal shape of the output data stream, in particular a symbol width and/or an edge steepness, on the basis of the clock information TI. In this way, the communication unit S1 can compensate variances in the clock rate of the output sampling clock signal CAAT and achieve that the output symbol clock has the same clock rate as the input symbol clock.

If the output sampling clock signal CAAT is rather fast, the communication unit S1 generates, based on the clock information TI, a digital output signal DAS, whose symbol width is rather wide and whose edges are rather flat. The digital output signal DAS3 is an example of this.

If the output sampling clock signal CAAT is rather slow, the communication unit S1 generates, based on the clock information TI, a digital output signal DAS, whose symbol width is rather narrow and whose edges are rather steep. The digital output signal DAS2 is an example of this.

The higher the clock rate (indicated by the clock information) of the internal reference clock signal of the communication unit S1 is, the wider the symbol widths of the digital output signal DAS are generated. Since the wider symbols are subsequently output with an output sampling clock signal (as the sampling rate) that is also increased (proportionally to the increased reference clock signal), the output data stream has the same symbol width as the input data stream. In this manner, the same symbol clock is provided at the output as at the input.

The adaptation of the symbol width is achieved in particular by the communication unit S1 adapting the clock ratio between the clock rate of the output symbol clock and the clock rate of the output sampling clock signal. This adjustment is based on the clock information TI. The adaptation takes place in particular continuously, in order to be able to compensate for fluctuations in internal clock signals. The clock ratio can be expediently set to a plurality of different values.

The clock rate of the output symbol clock is expediently equal to the reciprocal of the temporal symbol width of the output data stream. FIG. 3 shows three symbol widths SB1, SB2, SB3.

This adjustment of the clock ratio is expediently performed by the filter device 26 described above. Depending on the clock information TI (and the filter coefficients provided based on it), the filter device 26 performs an adjustment of the clock ratio. Expediently, the filter device 26 is able to achieve a plurality of different clock ratios.

This clock ratio adjustment can be achieved, for example, by using a sample rate conversion filter. In contrast to a conventional sampling rate conversion, the filtered digital output signal DAS of the communication unit S1 is not output with an adjusted sampling rate, but with a non-adjusted sampling rate—the internal output sampling clock signal CAAT. This is illustrated in FIG. 3 by the fact that the signal values SWA1, SWA2, SWA3 of the three digital output signals DAS1, DAS2, DAS3 each lie on the same clock CAAT.

Thus, when adjusting the clock ratio, the CAAT output sampling clock signal is not adjusted. Therefore, expediently only the symbol clock contained in the digital output signal DAS is adapted; in a sense, the digital output signal DAS is stretched or compressed temporally.

Since the CAAT output sampling clock signal is not adapted, it can be operated continuously at a relatively low clock rate in an energy-saving manner.

The communication unit S1 is preferably adapted to provide the output data stream with an output symbol clock having a permanently fixed phase relationship to the input symbol clock. In particular, the communication unit S1 is adapted to continuously adjust the signal shape of the output data stream as described above in order to achieve the permanently fixed phase relationship.

In particular by the measures described above, the first input E1 and the first output A1 are expediently coupled together such that (independent of the clock rate of the internal clock generator TG) the clock rate of the output symbol clock provided at the first output A1 is exactly identical to the clock rate of the input symbol clock received at the first input E1.

Expediently, the foregoing applies in correspondence to the second input E2 and the second output A2, which are preferably coupled together in an corresponding manner so that the clock rate of the output symbol clock provided at the second output A2 is exactly identical to the clock rate of the input symbol clock received at the second input E2.

This is expediently the case for all communication units S1, S2 of the communication system 10 acting as slaves, so that at each input and output through which the communication path or the serial data stream passes, exactly the same symbol clock is given, even if the respective internal clock generators TG provide different internal clock signals (e.g. internal clock signals which differ from each other).

In the following, the timer ZG shall be discussed. The timer ZG is adapted to provide a time value based on the input symbol clock. For example, the timer ZG is a counter. The timer ZG is adapted to increment or decrement the time value for an incoming symbol, for example a bit, in particular a line bit. Expediently, the time value is incremented or decremented for each incoming symbol. The timer ZG is adapted to continuously progress (or lead or carry) the time value according to the incoming input symbol clock.

As an example, the timer ZG receives the symbol clock from the clock synthesis unit TS1. Alternatively or in addition thereto, the timer ZG can also receive the symbol clock from the first input E1, the first output A1, the second input E2, the second output A2 and/or the clock synthesis unit TS2.

In the following, the communication unit M, which functions as the master, will be described in more detail:

The communication unit M has a clock generator GT for generating a global clock. As an example, the clock generator GT generates the global clock based on the internal clock signal of the internal clock generator TG of the communication unit M.

The communication unit M comprises an electronic circuit, for example a microprocessor, ASIC and/or FPGA. The units A1, E2, DG, GT, ZG are expediently part of the electronic circuit. The electronic circuit is clocked by the internal clock generator TG; i.e. the internal clock generator TG provides one or more internal clock signals for clocking the electronic circuit. The electronic circuit is indicated in FIG. 1 by a dashed frame.

The communication unit M has an output A1 and an input E2. Furthermore, the communication unit M has a data stream generator DG for generating a data stream. The communication unit M is adapted to provide the data stream as an output data stream at its output A1. The communication unit M uses the global clock as the output symbol clock of the output data stream. The output symbol clock can also be referred to as the transmit clock of the output data stream. Optionally, the communication unit M also includes data processing units DV1 and DV2.

The communication unit M sets, my means of the global clock, the output symbol clocks of all communication units S1, S2 acting as slaves. Furthermore, the communication unit M sets, by means of the global clock, the bit rate of the serial data stream.

The communication unit M is preferably adapted to provide the serial data stream as a sequence of telegrams. Expediently, the telegrams in the serial data stream are stringed together directly, i.e. without gaps. Expediently, the telegrams contain payload data and/or data fields for each communication unit S1, S2 following in the series.

The communication unit M is adapted to provide the serial data stream as a gapless data stream—i.e. in particular uninterrupted. If the communication unit M has no data available for transmission, in particular no payload data, the communication unit M fills the serial data stream with idle symbols. The output symbol clock is expediently provided by all symbols contained in the serial data stream, i.e. in particular by symbols representing payload data, idle data and/or protocol data.

In total, for the communication system 10, a serial data stream results, which, starting from the communication unit M, runs through the following communication units S1, S2 on the aforementioned communication path and always has exactly the same symbol clock rate at every point of the communication path. Furthermore, the number of symbols is preferably not changed by the communication units S1, S2 acting as slaves, so that the same number of symbols or clock cycles arrive at each timer. Consequently, by means of the timers ZG of different communication units M, S1, S2, time values can be provided that are synchronous to each other and/or synchronous to each other except for a possible offset.

Each communication unit S1, S2 acting as slave receives the data stream as input data stream and outputs the data stream as output data stream. The data, in particular the payload data, of the output data stream may be changed with respect to the input data stream; the number of symbols or clock cycles, however, should always remain constant.

In particular, the data stream is coded with a DC voltage-free code. Preferably the data stream is coded with an 8b10b code. Expediently, the data stream is transmitted in the baseband. The data stream is in particular a sequence of binary symbols, in particular impulses.

Figure 4:
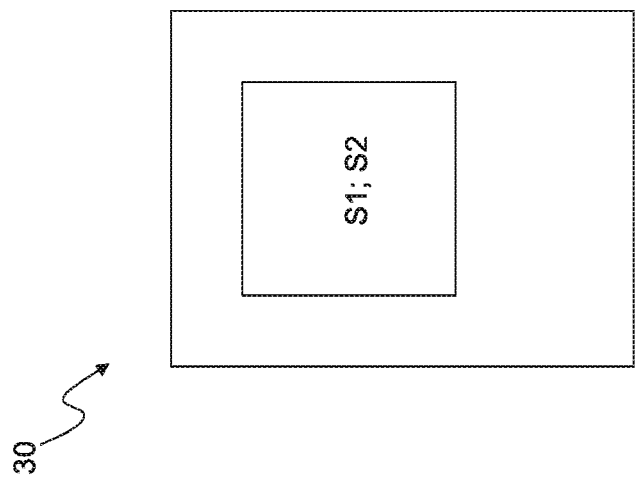
FIG. 4 shows a schematic representation of a control apparatus.

FIG. 4 shows a schematic representation of a control apparatus 20 comprising a communication unit S1 or S2 as described above. The control apparatus is configured to control a functional unit, in particular an actuator, sensor and/or a signal unit.

Figure 5:
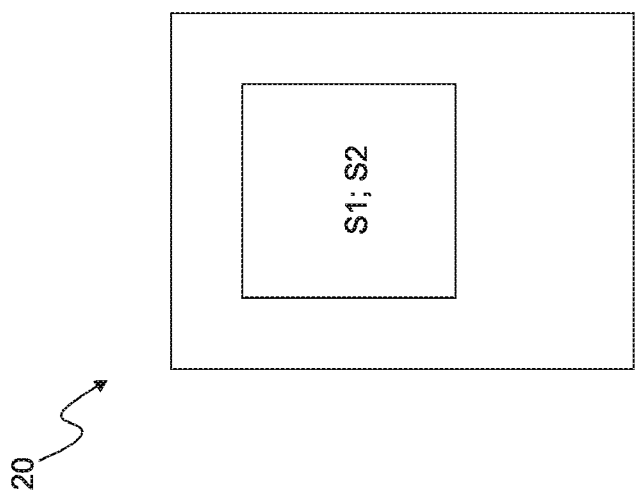
FIG. 5 shows a schematic representation of a field device.

FIG. 5 shows a schematic representation of a field device 30 comprising a communication unit S1 or S2 as described above. The field device is preferably a valve device.

What is claimed is:

1. A communication unit for industrial automation for use in a communication system of series-connected communication units, wherein the communication unit comprises a first input and a first output and is configured to receive, via the first input, an input serial data stream having payload data and to output, via the first output, an output serial data stream having payload data, wherein the communication unit is configured to determine, on the basis of an internal reference clock signal of the communication unit and an input symbol clock of the input data stream, clock information and to provide, using the clock information, the output data stream with an output symbol clock whose clock rate is equal to the clock rate of the input symbol clock, wherein the internal reference clock signal is coupled with an internal clock signal of the communication unit, the communication unit further comprising an internal clock generator which is configured to generate the internal clock signal independently of the input symbol clock and/or the output symbol clock.

2. The communication unit according to claim 1, wherein the clock information comprises a phase relationship and/or a clock rate relationship between the internal reference clock signal and the input symbol clock.

3. The communication unit according to claim 1, wherein the communication unit comprises a phase detector for determining the clock information.

4. The communication unit according to claim 1, wherein the phase detector comprises a Mueller-Muller phase detector for determining the clock information.

5. The communication unit according to claim 1, wherein the communication unit is configured to adapt the signal shape of the output data stream on the basis of the clock information.

6. The communication unit according to claim 1, wherein the communication unit is configured to adapt, on the basis of the clock information, a symbol width and/or an edge steepness of the output data stream.

7. The communication unit according to claim 1, wherein the communication unit is adapted to generate the output data stream using an internal output sample clock signal.

8. The communication unit according to claim 7, wherein the communication unit is adapted to adjust a clock ratio between the output symbol clock and the internal output sample clock signal on the basis of the clock information.

9. The communication unit according to claim 8, wherein the communication unit is configured not to adjust the output sample clock signal when adjusting the clock ratio.

10. The communication unit according to claim 8, wherein the clock ratio of the output sample clock signal to the clock rate of the output symbol clock is less than 2.

11. The communication unit according to claim 8, wherein the clock ratio of the output sample clock signal to the clock rate of the output symbol clock is less than 1.8 or equal to 1.8.

12. The communication unit according to claim 1, wherein the communication unit is configured to provide a digital output signal comprising a signal sequence of signal values, wherein each signal value has a resolution greater than 1 bit, and the communication unit is further configured to provide the output data stream based on the digital output signal using a digital-to-analog converter.

13. The communication unit according to claim 12, wherein the communication unit is configured to provide the digital output signal using a filter device, and is configured to adjust filter coefficients of the filter device on the basis of the clock information so that a symbol clock rate contained in the digital output signal is equal to the clock rate of the input symbol clock.

14. The communication unit according to claim 12, wherein the digital output signal represents the signal shape of the output data stream to be output.

15. The communication unit according to claim 14, wherein the signal shape of the output data stream to be output, which signal shape is represented by the digital output signal, comprises bump-shaped impulses.

16. The communication unit according to claim 14, wherein the signal shape of the output data stream to be output, which signal shape is represented by the digital output signal, comprises cosine-shaped impulses.

17. A control apparatus comprising a communication unit according to claim 1, wherein the control apparatus is configured to control a functional unit.

18. The control apparatus according to claim 17, wherein the functional unit comprises an actuator, a sensor and/or a signal unit.

19. A field device comprising a communication unit according to claim 1.

20. The field device according to claim 19, wherein the field device is a valve device.

21. A communication system comprising a first communication unit and a plurality of second communication units, the second communication units each being adapted in accordance with claim 1, wherein the first communication unit has an output and an input and the second communication units each have a first input, a first output, a second input and a second output, wherein the first and second communication units are connected in series, such that a communication path is provided which, starting from the output of the first communication unit, runs in the order prescribed by the series successively through each first input and each second output of the second communication units to the first output of the last second communication unit in the series, and from there runs in reverse order successively through each second input and each second output to the input of the first communication unit, wherein each first and second communication unit has its own internal clock generator and the internal clock generators of the first and second communication units are not synchronized with each other.

22. A method for providing an output data stream, comprising the steps of:
receiving, with a communication unit, an input data stream;
determining clock information based on an input symbol clock of the input data stream and an internal reference clock signal of the communication unit; and
providing, using the clock information, the output data stream with an output symbol clock whose clock rate is equal to the clock rate of the input symbol clock,
wherein the internal reference clock signal is coupled with an internal clock signal of the communication unit, and wherein an internal clock generator of the communication unit generates the internal clock signal independently of the input symbol clock and/or the output symbol clock.

23. A communication system comprising a first communication unit and a plurality of second communication units, the second communication units each comprising a first input and a first output and each being configured to receive, via the first input, an input serial data stream having payload data and to output, via the first output, an output serial data stream having payload data, wherein each second communication unit is configured to determine, on the basis of an internal reference clock signal of the respective second communication unit and an input symbol clock of the input data stream, clock information and to provide, using the clock information, the output data stream with an output symbol clock whose clock rate is equal to the clock rate of the input symbol clock, wherein the first communication unit has an output and an input and the second communication units each further have a second input and a second output, wherein the communication units are connected in series, such that a communication path is provided which, starting from the output of the first communication unit, runs in the order prescribed by the series successively through each first input and each second output of the second communication units to the first output of the last second communication unit in the series, and from there runs in reverse order successively through each second input and each second output to the input of the first communication unit, wherein each first and second communication unit has its own internal clock generator and the internal clock generators of the first and second communication units are not synchronized with each other.

* * * * *